(12) United States Patent
Chatterjee et al.

(10) Patent No.: US 7,698,240 B1
(45) Date of Patent: Apr. 13, 2010

(54) SYSTEM AND METHOD FOR PROVIDING ELECTRONIC FINANCIAL TRANSACTION SERVICES

(75) Inventors: Pallab K. Chatterjee, Dallas, TX (US); Gregory A. Brady, Colleyville, TX (US); Dennis A. Kump, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 2185 days.

(21) Appl. No.: 09/686,711

(22) Filed: Oct. 10, 2000

Related U.S. Application Data

(60) Provisional application No. 60/204,156, filed on May 15, 2000.

(51) Int. Cl.
*G06Q 40/00* (2006.01)
*G06F 17/00* (2006.01)

(52) U.S. Cl. ............................ 706/36; 705/35; 705/39

(58) Field of Classification Search .................. 705/26, 705/27, 31
See application file for complete search history.

(56) References Cited

U.S. PATENT DOCUMENTS

| | | | |
|---|---|---|---|
| 4,799,156 A | * | 1/1989 | Shavit et al. .................. 705/26 |
| 4,992,940 A | | 2/1991 | Dworkin ...................... 364/401 |
| 5,910,896 A | | 6/1999 | Hahn-Carlson ........ 364/479.01 |
| 5,970,475 A | | 10/1999 | Barnes et al. .................. 705/27 |
| 5,987,429 A | | 11/1999 | Maritzen et al. .............. 705/31 |

\* cited by examiner

*Primary Examiner*—Charles R Kyle
*Assistant Examiner*—Siegfried E. Chencinski
(74) *Attorney, Agent, or Firm*—Booth Udall, PLC; Steven J. Laureanti

(57) ABSTRACT

A computer-implemented marketplace (16) for providing financial transaction services to participants (12, 14, 60, 62) in connection with commercial transactions involving the participants (12, 14, 60, 62) includes a database (22). The database (22) contains registration information for types of transactions available to participants (12, 14, 60, 62) and participation criteria for each participant (12, 14, 60, 62) that specifies types of transactions in which the participant (12, 14, 60, 62) is willing to participate. Processes (24) provide associated financial transaction services for the participants (12, 14, 60, 62) in connection with ongoing transactions involving the participants (12, 14, 60, 62). The marketplace (16) initiates a selected process (24) in response to a specified event associated with an ongoing transaction, according to the registration information and participation criteria, to provide a corresponding financial transaction service to at least one participant (12, 14, 60, 62) involved in the ongoing transaction.

42 Claims, 1 Drawing Sheet

SYSTEM AND METHOD FOR PROVIDING ELECTRONIC FINANCIAL TRANSACTION SERVICES

RELATED APPLICATION

This application claims the benefit under 35 U.S.C. § 119(e) of U.S. Provisional Application Ser. No. 60/204,156, filed May 15, 2000.

TECHNICAL FIELD OF THE INVENTION

This invention relates in general to the field of electronic commercial transactions and, in particular, to a system and method for providing electronic financial transaction services.

BACKGROUND OF THE INVENTION

In the modern economic environment, businesses increasingly conduct business transactions electronically using the Internet or other computer network ("e-commerce"). Although originally primarily limited to business-to-consumer ("B2C") transactions, the fastest growth within the e-commerce field now involves infrastructure and applications to support increasingly sophisticated business-to-business ("B2B") transactions. These B2B transactions in particular may involve rather complicated financial transactions to reconcile the various accounting and other back-office processes employed at both the buyer and the seller, which may be, for example, two members of a supply chain.

As just an example, a traditional electronic B2B transaction between a buyer and a seller of goods might involve the buyer submitting an electronic purchase order to the seller, the seller processing this purchase order as appropriate (and perhaps accessing a supply chain planning application in the process), and the seller then manufacturing and shipping the goods to the buyer to fulfill the purchase order. The seller must then send invoice instructions to a separate accounting process for generation of an invoice to the buyer, creation of accounts receivable records, and the like. The seller then waits to get paid. The buyer receives the goods and must accept or reject the goods in whole or in part, update its inventory information, and return any rejected goods to the seller. The buyer typically waits until the order is accepted, which may include waiting until any replacement goods are received and accepted, before paying the invoice (less appropriate adjustments for rejected goods or otherwise). When the seller receives these returns, it ships replacement goods to the buyer to fulfill the order, along with performing any additional supply chain planning, inventory, or other back-office processes associated with the return and re-shipment. The buyer eventually pays in full, modifies its accounts payable, generates internal accounting information, and generates financial statements, profit and loss (P&L) statements, budgets, and the like reflecting payment. Similarly, when the seller finally receives payment from the buyer, the seller posts the payment, ages its accounts receivable, generates internal accounting information, and generates financial statements, P&L statements, budgets, and the like reflecting payment.

A feature of such commercial transactions in previous environments is that both the buyer and the seller must often wait while one party receives information from the other, processes it, and communicates responsive information to the other party. As a result, even a commercial transaction involving a single purchase order may take weeks or longer to be completed through settlement. This may prevent certain buyers who would otherwise pay quickly from being able to negotiate with sellers for lower prices based on such quick payment, ties up the working capital of sellers while these sellers wait for payments to be received, and has numerous other deficiencies. Thus, previous systems and methods for conducting electronic commercial transactions are inadequate for the needs of many business users.

SUMMARY OF THE INVENTION

According to the present invention, problems and disadvantages associated with previous techniques for conducting electronic commercial transactions are substantially reduced or eliminated.

According to one embodiment of the present invention, a computer-implemented marketplace for providing one or more financial transaction services to participants in connection with commercial transactions involving the participants includes a database containing registration information for one or more types of transactions available to participants through the marketplace. The database also contains participation criteria for each participant specifying one or more types of transactions in which the participant is willing to participate in association with the marketplace. One or more processes each may provide an associated financial transaction service for one or more participants in connection with ongoing transactions involving the participants. The marketplace may initiate a selected process in response to a specified event associated with an ongoing transaction, according to the registration information and participation criteria, to provide a corresponding financial transaction service to at least one participant involved in the ongoing transaction.

According to another embodiment of the present invention, software operating at a computer-implemented marketplace settles a commercial transaction between a buyer and a seller. The software is embodied in a computer-readable medium and is capable of receiving an order for at least one item from the buyer, communicating the order to the seller for fulfillment of the order, receiving notification from the seller in response to shipping of the item, receiving notification from the buyer in response to acceptance of the item, communicating payment instructions to at least one financial agent associated with the buyer, receiving payment from the financial agent associated with the buyer, communicating the payment to a financial agent associated with the seller, receiving notification from the seller in response to acceptance of the payment, and communicating accounting information reflecting settlement of the transaction.

The present invention provides a number of technical advantages over previous techniques. The settlement marketplace of the present invention allows a wide variety of electronic financial transaction services to be readily provided in connection with an associated commercial transaction, resulting in significant value to the businesses and financial institutions involved. For example, buyers may be able to pay more quickly and, as a result, obtain favorable pricing considerations from sellers for quick payment. Sellers may be able to obtain payment more quickly, thereby reducing working capital requirements. Sellers may also benefit from reduced administrative and other costs associated with accounts receivable processing, accounts payable processing, treasury, credit, collections, and other processes. Both buyers and sellers may benefit from a faster "order-to-cash" cycle between order initiation and final payment, which may be reduced from weeks to days or less according to the present invention. Furthermore, financial institutions benefit from having previously unknown risk qualified customers introduced to them, beyond those with which the financial institutions may already have existing relationships, thereby extending their market reach. Furthermore, the operator of the settlement marketplace may benefit from fee revenue associated with processing and supporting the various electronic financial transaction services provided to marketplace participants.

Systems and methods incorporating one or more of these or other technical advantages are very well suited for modern e-commerce environments such as those associated with the Internet. Other technical advantages are readily apparent to those skilled in the art from the following figures, descriptions, and claims.

DETAILED DESCRIPTION OF THE INVENTION

Figure 1:
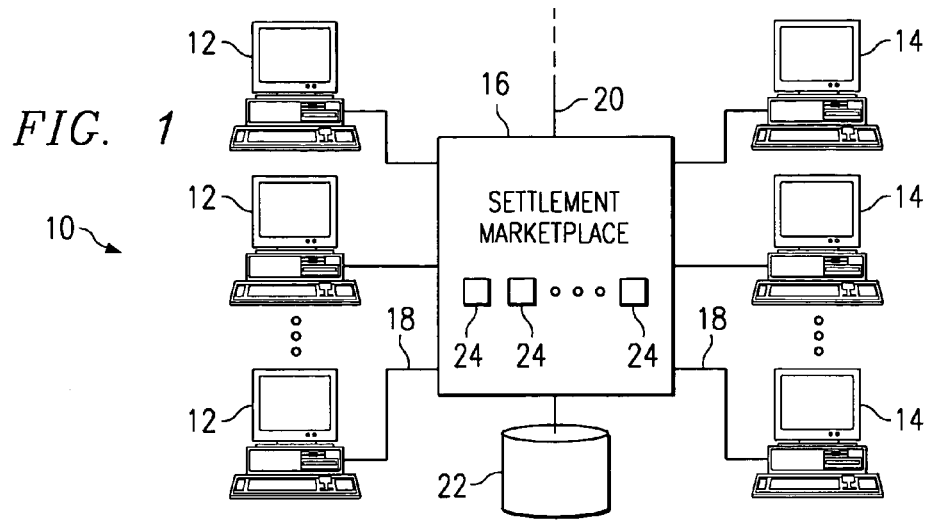
FIG. 1 illustrates an exemplary system for providing electronic financial transaction services.

FIG. 1 illustrates an exemplary system 10 for providing electronic financial transaction services. System 10 includes one or more buyers 12 and one or more sellers 14 that are coupled to a settlement marketplace 16 using associated links 18, which may be any appropriate wireline, wireless, or other communications links. For example, each link 18 may include one or more local area networks (LANs), metropolitan area networks (MANs), wide area networks (WANs), a global computer network such as the Internet, or any other suitable network or networks. Buyers 12 and sellers 14 may be individuals, businesses, or other suitable entities that communicate information with the settlement marketplace 16 in connection with commercial transactions with one or more sellers 14 or buyers 12, respectively. Settlement marketplace 16 is preferably associated with an impartial individual, business, or other operator appropriate to manage the activities of settlement marketplace 16 and communicate with buyers 12 and sellers 14 to facilitate the provision of electronic financial transaction services. Buyers 12 and sellers 14 may also communicate with one another other than through the settlement marketplace 16, as appropriate, using any wireline, wireless, or other communications link (not explicitly shown), such as the Internet. As described more fully below, settlement marketplace 16 supports one or more processes 24 each providing one or more corresponding financial transaction services according to the operation of system 10.

A buyer 12 may be a manufacturer, assembler, distributor, wholesaler, retailer, consumer, or any other entity that generates demand requests (such as bids), purchase orders, and the like for communication to one or more sellers 14. A seller 14 may be a raw materials or component supplier, manufacturer, assembler, distributor, wholesaler, retailer, or any other entity that generates promises (such as quotes, bid acceptances, and the like) in response to demand requests from one or more buyers 12. Although only a single buyer 12 and a single seller 14 are principally discussed, those skilled in the art will appreciate that the present invention is similarly applicable to situations involving any number of buyers 12 and sellers 14, according to particular needs. A buyer 12 with respect to one transaction may be a seller 14 as to one or more other transactions, and vice versa. A buyer 12 or a seller 14 may be involved in two or more simultaneous transactions, with the same or different sellers 14 or buyers 12, respectively, where the transactions may be interleaved in any suitable manner.

Moreover, although a single settlement marketplace 16 is primarily described, multiple settlement marketplaces 16 integral to or separate from one another may each interact with the same or different buyers 12 and sellers 14 according to the present invention.

Buyers 12, sellers 14, and settlement marketplace 16 are each associated with one or more computers at one or more locations. Reference herein to buyer 12, seller 14, or settlement marketplace 16 is meant to include reference to one or more associated human users, one or more suitable software components operating on associated computers, or a combination of human users and software components suitable to perform the activities of settlement marketplace 16 with respect to the provision to participants of electronic financial transaction services. These computers may each include an appropriate input device, such as a keypad, mouse, touch screen, microphone, or other suitable device to receive input. An output device may convey information associated with the operation of system 10, including visual or audio information. The computers may include suitable fixed or removable storage media, such as hard disks, "floppy" diskettes, CD-ROMs, or other media to receive input and provide output. The computers may further include processors and associated volatile or non-volatile memory to execute instructions and manipulate information according to the operation of system 10. A buyer 12 may share one or more computers or any other resources with one or more other buyers 12 or with one or more sellers 14. Similarly, a seller 14 may share one or more computers or any other resources with one or more other sellers 14 or with one or more buyers 12. Data storage is provided in whole or in part by database 22, which may include one or more storage locations integral to or separate from settlement marketplace 16.

In one embodiment, settlement marketplace 16 may be coupled to a marketplace-to-marketplace ("M2M") transaction services network through which electronic financial transaction services associated with settlement marketplace 16 may be made available to buyers and sellers interacting with another electronic marketplace coupled to the M2M transaction services network. For example only and without limitation, copending U.S. application Ser. No. 09/679,464 describes suitable techniques for brokering such services among electronic marketplaces using a service transaction broker. Participants may be able to register for services of settlement marketplace 16 in the same or similar way as they register for access to services associated with other marketplaces. Alternatively, some or all of the services of settlement marketplace 16 may be supported on the same marketplace through which the underlying commercial transaction is initiated.

Settlement marketplace 16 may provide "basic" financial transaction services to buyers 12, sellers 14, or both buyers 12 and sellers 14 using one or more corresponding processes 24. The software used to provide the operational functionality for such basic services is preferably readily extendible to allow additional basic or other services to be provided beyond or in replacement of those offered within the initial implementation of system 10, according to particular needs. Although a single service of each type may be described below, the present invention contemplates any number of services of each type being available, for example, to accommodate various particular needs. The settlement marketplace 16 may partner with one or more third parties to provide these or other services.

Settlement marketplace 16 may support one or more credit card, purchasing card, debit card, cash card, or other card processing services to tailor the payment method to the nature of buyer 12 and the value of the commercial transaction. As an example, if settlement marketplace 16 provides electronic financial transaction services associated with B2C or business-to-small-business ("B2SmallB") commercial transactions, it may be desirable for settlement marketplace 16 to have the ability to charge credit cards of buyers 12. For such services associated with larger businesses, it may be desirable to charge purchasing cards of buyers 12 where the value of the underlying transaction is relatively small, particularly for an indirect material, component, or other procurement scenario. Larger transactions will preferably be handled using the enhanced services of settlement marketplace 16 described more fully below. Appropriate levels of security may be provided for Internet-based or other transactions carried out over a non-private network, such as requiring pre-qualification, usernames, passwords, or other appropriate security information to access these card processing services.

In one embodiment, service functionality associated with settlement marketplace 16 may interface with supply chain planning or other enterprise resource planning (ERP) functionality integral to or separate from settlement marketplace 16 to support one or more appropriate back-office processes of buyers 12, sellers 14, or both buyers 12 and sellers 14. For example, and not by way of limitation, such ERP support might be as simple as communicating a facsimile message providing transaction-related information to a buyer 12 or seller 14. Alternatively, ERP support might include a fully integrated interface to multiple ERP applications, engines, or other resources integral to or separate from settlement marketplace 16. For example, settlement marketplace 16 might provide a shared ERP integration hub for buyers 12 and sellers 14 that are coupled to settlement marketplace 16 and subscribe to such ERP functionality, the hub passing information to and from participants as appropriate. Although such a solution would likely become relatively complex and maintenance intensive over time, it could generate significant transaction fees payable to the operator of settlement marketplace 16 as a value-added feature available to participants. Settlement marketplace 16 may include electronic data interchange (EDI) interfaces and service functionality suitable to support EDI-based transactions.

Commercial transactions involving buyers 12 and sellers may require suitable international payment mechanisms, letters of credit for international transactions, and other suitable services relating to international transactions. Other services, relating to domestic and international transactions, may include services for taxation, remittance, electronic funds transfer (EFT), electronic benefit transfer (EBT), electronic or other check handling, electronic or other cash handling, barter arrangements, escrow handling, integration with a suitable automated clearinghouse (ACH) network, converged bills and statements, and any other appropriate services, in any suitable combination and without limitation. Settlement marketplace 16 may partner with one or more financial service providers or other third parties to render such services.

Instead or in addition to these or other basic services, settlement marketplace 16 may provide "enhanced" electronic financial transaction services using processes 24 to help marketplace participants, such as buyers 12, sellers 14, and their respective financial agents, expedite the cash flow process between these participants and capture other important benefits associated with settlement marketplace 16 in connection with the commercial transactions involving the participants. Adopting operational procedures to allow settlement marketplace 16 to handle some or all financial aspects of commercial transactions involving buyers 12 and sellers 14, triggered on predetermined events or otherwise, may reduce the "order-to-cash" lag time between order initiation and final payment. Decreased payment times may allow certain buyers 12 to obtain favorable pricing and allow sellers 14 to reduce working capital for a given transaction or set of transactions. Quicker order-to-cash cycles may also reduce the number of accruals and reversals that a particular participant might need to generate, thus reducing its overhead costs. Settlement marketplace 16 and the financial agents of buyers 12 and sellers 14 may extract fee revenue for the services. Although a single service of each type may be described below with respect to each process 24, the present invention contemplates multiple services of each type, perhaps varied to suit the particular needs of various marketplace participants. Settlement marketplace 16 may partner with one or more third parties to provide these or other enhanced services.

Participant Qualification Process

Participants may include buyers 12, sellers 14, and their respective financial or other financial agents. Each is preferably pre-qualified in a manner appropriate to earn and promote the trust and confidence of other participants with which they may deal in association with settlement marketplace 16. In one embodiment, buyers 12 may be judged on their credit worthiness and their ability to complete applicable commercial transactions, pay for them, and perform any other responsibilities in a timely manner. Credit worthiness may be determined, for example, automatically according to one or more specified criteria or by staff working on behalf of settlement marketplace 16 and using tools such as Dun & Bradstreet, Moody's, credit bureaus, bank references, and the like. Buyers 12 may be rated, ranked, or otherwise categorized according to appropriate tiered risk classifications or in any other suitable manner. Sellers 14 may be judged based on their ability to deliver acceptable quality goods or services, handle rejects and returns, provide proper customer care, and perform other responsibilities in a timely manner. In particular, sellers 14 must preferably have adequate financial resources to cover operations while awaiting payment from their buyers 12. The financial agents associated with buyers 12 and sellers 14 may be pre-qualified based on their ability to finance transactions, handle related administrative and systems processing, and perform any other responsibilities in a timely manner. Certain financial agents may be qualified generally, as to all transactions involving all buyers 12 and sellers 14, or may choose to participate (or may be restricted from participating) in selected transactions and as to selected buyers 12 and sellers 14. Similarly, buyers 12 and sellers 14 may also be pre-qualified generally or as to selected transaction types or transactions involving selected participants. Qualification information may be stored in the database 22 or in another suitable location.

Participant Performance Monitoring Process

Once participants have been qualified, their performance may be monitored as appropriate to ensure that they comply with standards necessary to retain their rating, ranking, or qualification. Based on this monitoring, a participant may have its rating, ranking, or qualification lowered or even removed, such that it is barred perpetually or temporarily from interacting with settlement marketplace 16. For example, a seller 14 that receives a relatively high number of rejects, returns, or other adjustments from a representative sample of buyers 12 may have its rating lowered. Similarly, a buyer 12 that generates a relatively high number of rejects, returns, or other adjustments with respect to a representative sample of sellers 14 may have its rating lowered. Financial agents that fail to timely transfer payments in a relatively large number of cases might have their rating lowered. The present invention contemplates monitoring participant performance according to any appropriate criteria to ensure settlement marketplace 16 retains its status as trusted commercial entity. Monitoring information may be stored in database 22 or in another suitable location.

Business Data Verification Process

Name, address, telephone number, fax number, e-mail address, uniform resource locator (URL), or other suitable business data verification services may be supported as appropriate. This information may be stored in the database 22 or in any other suitable location.

Secure Electronic Identification Process

In one embodiment, it is important that participants be who they claim to be, else trust and confidence in settlement marketplace 16 and its services may be compromised. Corporate-level x.509 or other suitable digital certificates may be used to uniquely and positively identify business participants. Certain individuals associated with a business may similarly have digital certificates uniquely and positively identifying them. Such authentication may be performed at least in part in connection with the qualification process described above. Moreover, as "smart card" technology evolves, it is likely to enhance the utility of digital certification. Authentication may be linked to a suitable approval level hierarchy setting forth appropriate limits on the authority of individuals within a business to participate in transactions on its behalf. All parties involved in a particular transaction will preferably be uniquely and positively identified through one or more of these processes. Such identification of participants preferably enables new relationships to be formed between trusted buyers 12, sellers 14, and financial agents seeking to represent buyers 12 and sellers 14. It may also contribute to the ability of settlement marketplace 16 to accurately issue payments and credits as well as track the historical activity of participants. This information may be stored in database 22 or in any other suitable location.

Transaction Selection Process

In one embodiment, as discussed above, all participants preferably specify which types of transactions they wish to participate in. Selection criteria may include, for example and not by way of limitation, value limits, quantity limits, types of goods or services, delivery requirements, the nature of the transaction (for example, an exchange, auction, or reverse auction), and any other suitable criteria. Selection preferably occurs in connection with participant qualification, such that all transaction selection criteria received from participants may be suitably validated. For example, a participant will preferably be unable to select and subsequently participate in any transaction for which the participant is not pre-qualified. Transaction selection criteria may be stored in the database 22 or any other suitable location.

Time Based Lines of Credit Process

Financial agents may grant participants appropriate virtual lines of credit, which may be valid generally or for only selected types of transactions or for a specified time period. Associated information may be stored in database 22 or in any other suitable location.

Bonding and Insurance Process

Participants may arrange appropriate bonding and insurance coverage through settlement marketplace 16 according to their particular needs. Associated information may be stored in database 22 or in any other suitable location.

Transaction Registration Process

Commercial transactions to be financed using settlement marketplace 16 must first be registered with settlement marketplace 16. In one embodiment, the registration process includes recording in database 22 the transaction characteristics, timings, pay points, authorization triggers (for example, receipt instructions that trigger payments), monitoring and auditing requirements, and any other transaction-related information, singly or in any suitable combination. Transactions may be registered by buyers 12, sellers 14, or automatically. For example, the transaction information may be stored in response to the initiation of the underlying commercial transaction (through settlement marketplace 16 or another suitable marketplace coupled to settlement marketplace 16), in response to the commercial transaction reaching a specified point, or in another suitable manner. Registration information may be stored in the database 22 or in any other suitable location.

Transaction Activity Monitoring Process

Transactions themselves, and the transaction activities of each participant with respect to settlement marketplace 16, may be monitored as appropriate. For example, transactions may be monitored for failure to complete within an expected time or for the occurrence of any other specified event. A seller 14 may be monitored for failure to ship goods within the time promised. A buyer 12 may be monitored for failure to accept or reject goods within a suitable period. A financial agent may be monitored for failure to effect timely payment. Event-based messages and alarms may be communicated to the appropriate participants, to the operator of settlement marketplace 16, to associated third parties, or to any other entity according to transaction registration rules or other suitable guidelines relating to transaction activity monitoring. This activity monitoring process may feed or otherwise cooperate with the participant performance monitoring process described above. Monitoring information may be stored in database 22 or in any other suitable location.

Funds Transfer and Settlement Process

Funds will in general be transferred between buyers 12 and sellers 14 (or their financial agents on their behalf) in response to explicit instructions from buyers 12 and sellers 14 or, more preferably, automatically in response to specified triggering events. Payments may be made, any adjustments applied, and transactions settled as appropriate, typically in much less time than with previous settlement options. If a participant is involved in multiple transactions with another participant (being a buyer 12 with respect to two transactions with the same seller 14, for example), the transactions may optionally be netted against one another to further improve efficiency and performance.

Currency Conversion and Fluctuation Process

Settlement marketplace 16 is preferably able to account for currency fluctuations and define exchange rate fixing rules for transactions involving participants dealing in different currencies. Associated information may be stored in database 22 or in another suitable location.

Audit Process

All transactions may be subject to audit. In one embodiment, transaction logs are kept for all transactions and stored in transaction database 22 or elsewhere. Converged statements may be made available to participants over the Internet or otherwise to support the audit process. Participants may also maintain their own supporting documentation, which may also be subject to audit.

Adjustments and Dispute Resolution Process

A mediation process may be supported to help resolve disputes. Adjustments in connection with rejects, returns, disputes, or other scenarios may be handled according to rules established in connection with participant qualification, transaction registration, or otherwise. Associated information may be stored in database 22 or any other suitable location.

Generate Accounting Entries Process

Settlement marketplace 16 may offer an optional fee-based service that generates, or allows participants to generate, accounting entries for posting to the general ledgers or other financial systems of participants. This may require an appropriate set of tools to capture, synchronize, and transform identification and transaction data according to the particular needs of such participants. Associated information may be stored in database 22 or in any other suitable location.

Accounts Receivable and Accounts Payable Process

In one embodiment, many of the processes normally associated with traditional accounts payable or accounts receivable processing may take place within or under the supervision of the settlement marketplace 16. For example, in cases where settlement marketplace 16 or any associated electronic marketplaces decide to take title to goods, services, or other items and act as aggregators and distributors (to attain economies of scale or for any other reason), settlement marketplace 16 preferably provides a relatively complete financial system to include general ledger, accounts receivable, and accounts payable functionality. In such cases, these marketplaces may have intervening buy and sell relationships with various supply chain members and may therefore be required to account for their activities as independent business entities. These enhanced processes may feed the supply chain planning or other ERP systems of participants, or an ERP solution integral to the settlement marketplace 16, with detailed, summary, or any other suitable information.

Customer Care Process

An appropriate mix of participant self-service, automated help functionality, and customer service representatives will provide for customer care. Controlled access to some or all transaction data is preferably granted to participants as appropriate, allowing them to access substantially real-time status information concerning transaction in which they are involved.

Figure 2:
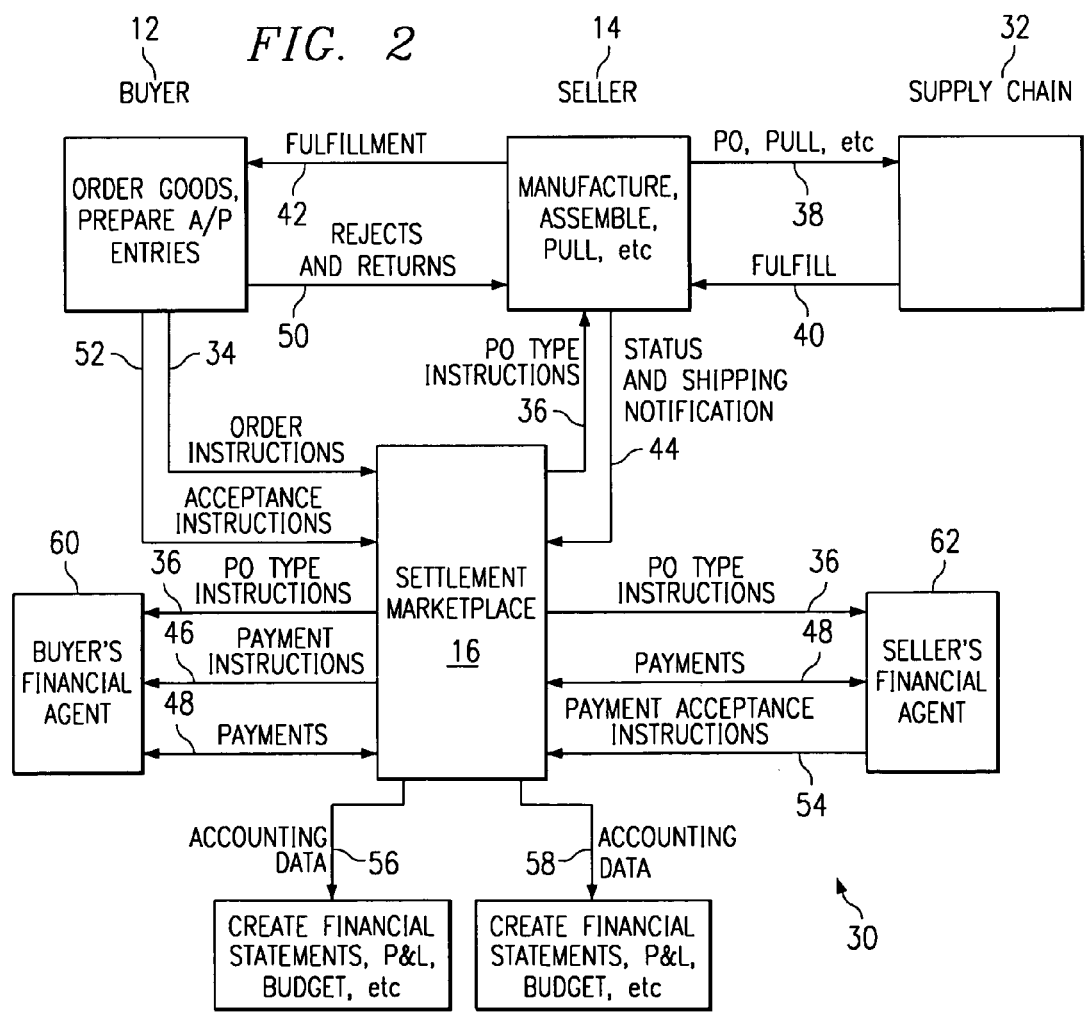
FIG. 2 illustrates an exemplary method for providing electronic financial transaction services.

FIG. 2 illustrates an exemplary method 30, which is merely one of many possible process scenarios, for providing electronic financial transaction services using settlement marketplace 16. Although method 30 is described as involving a single buyer 12 and a single seller 14, the present invention is intended to encompass any suitable number of buyers 12 and sellers 14 according to particular needs. Moreover, although method 30 is described below with respect to an order for goods, the present invention contemplates method 30 operating analogously with respect to services or other items. Method 30 is described as an exchange scenario with the understanding that a buyer 12 has already selected a particular seller 14 based on availability, cost, delivery schedule, and other factors deemed important to buyer 12 (as opposed to an auction scenario, for example). In addition, it is assumed for this example that the buyer 12 has selected or been given the option, by seller 14 or settlement marketplace 16, to use a financier or other financial agent 60 for financial assistance, to provide partial payment upon the shipment of the ordered goods, and to provide the balance due upon final acceptance of the goods. Seller 14 is likewise assumed to have selected a financier or other financial agent 62, possibly the same as the financial agent 60 for buyer 12, to handle payment aspects of the transaction on behalf of seller 14. In general, settlement marketplace 16 handles order generation, status notification, billing, and payment operations associated with the transaction.

Method 30 begins when the buyer 12 orders one or more goods from seller 14, in this example, through another associated electronic commercial transaction marketplace, and submits corresponding order instructions to settlement marketplace 16 (arrow 34). The order instructions may be communicated directly from the buyer 12 to settlement marketplace 16 or may be communicated indirectly through the associated commercial transaction marketplace to settlement marketplace 16, with or without the knowledge of buyer 12. In response, settlement marketplace 16 communicates corresponding purchase order type instructions to seller 14 (arrow 36) and preferably also to financial agents 60 and 62 of buyer 12 and seller 14, respectively. After receiving these instructions, seller 14 may submit corresponding purchase order information to its associated supply chain planning or other ERP functionality 32, pull the ordered goods from its inventory, and perform any other appropriate back-office operations (arrow 38). Seller 14 fulfills the order (arrows 40 and 42) and communicates the order status, shipping notification, and any other suitable information to settlement marketplace 16 (arrow 44).

Settlement marketplace 16 issues shipping-based or other appropriate payment instructions to financial agent 60 of buyer 12 (arrow 46) and financial agent 60 issues an EFT or other appropriate progress payment to the financial agent 62 of seller 14 using settlement marketplace 16 (arrows 48). The present invention contemplates a payment directly from agent 60 to agent 62, with or without a notification from agent 60 to the settlement marketplace 16 or confirmation from agent 62 to settlement marketplace 16. At some point, buyer 12 receives and may accept the shipped goods in whole or part, rejecting and returning any unacceptable or otherwise unwanted goods. Describing the situation in which buyer 12 accepts part of the shipment and rejects the remainder, by way of example and without limitation, buyer 12 returns the rejected goods to seller 14 (arrow 50) and issues acceptance instructions to the settlement marketplace 16 for the remaining goods (arrow 52). In one embodiment, acceptance instructions may include information such as the status of the order, payment instructions as to accepted goods, and notice of the rejections (arrow 52). For purposes of this example, it is assumed that buyer 12 does not receive replacement goods in lieu of the goods returned, else some or all of the above would be repeated as to the replacement goods.

Settlement marketplace 16 communicates payment, and possibly refund (where the initial payment upon shipment exceeds the amount due for the accepted goods, for example), instructions to financial agent 60 of buyer 12 (arrow 46). Agent 60 issues an EFT or another suitable payment, or possibly a refund request, to financial agent 62 of seller 16 using settlement marketplace 16 (arrows 48). As described above, the present invention contemplates payment directly from agent 60 to agent 62, with or without a notification or confirmation to settlement marketplace 16. Agent 62 of seller 14 issues payment acceptance instructions to the settlement marketplace 16 (arrow 54) and the commercial transaction is completed through settlement. As discussed above, the time between order initiation and final payment may be reduced from weeks to days or less according to the present invention, providing an important technical advantage.

Finally, appropriate accounting data for buyer 12 may be modified to reflect the consummation of the commercial transaction, including its satisfactory settlement, and communicated to accounting or other ERP functionality associated with the buyer 12 (arrow 56). Similarly, suitable accounting data for seller 14 may be modified to reflect consummation of the commercial transaction, including its satisfactory settlement, and communicated to accounting or other ERP functionality associated with the seller 14 (arrow 58). In response to the settlement of the associated commercial transaction, the settlement marketplace 16 closes the transaction and transaction-related data in database 22 is modified accordingly.

In one embodiment, as described above, any suitable information relating to one or more of the processes described more fully above with respect to FIG. 1 may be stored in database 22 and modified as appropriate during the operation of system 10 in connection with method 30. One or more customer service agents and the participants themselves may have access to such transaction-related data throughout the life cycle of the transaction, such that buyer 12 and its financial agent 60, seller 14 and its financial agent 62, and settlement marketplace 16 have desired visibility into such data. Periodic summaries of transaction-related information may be generated, stored in database 22, and provided to participants instead of or in addition to raw or otherwise more detailed transaction-data collected during the transaction.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented marketplace for providing one or more financial transaction services to participants in connection with commercial transactions involving the participants, comprising:
   a database containing:
      registration information for one or more types of transactions available to participants through the marketplace;
      participation criteria for each participant specifying one or more types of transactions in which the participant is willing to participate in association with the marketplace, each participant being pre-qualified to enter into the one or more types of transactions specified in the participation criteria for the participant; and
      one or more processes each operable to provide an associated financial transaction service for one or more participants in connection with ongoing transactions involving the participants;
   the marketplace operable to:
      initiate a selected process in response to a specified event associated with an ongoing transaction, according to the registration information and participation criteria, to provide a corresponding financial transaction service to at least one participant involved in the ongoing transaction; and
      monitor activities of the at least one participant in the ongoing transaction to assess whether the participant should continue to be pre-qualified to participate in transactions of the same type as the ongoing transaction.

2. The marketplace of claim 1, wherein at least some of the registration information comprises a time limit for a transaction or one or more aspects thereof.

3. The marketplace of claim 1, wherein at least some of the registration information comprises a payment point, the marketplace operable to generate payment instructions for communication to a participant in response to a transaction reaching the payment point.

4. The marketplace of claim 1, wherein at least some of the participation criteria is selected from the group consisting of item type information, value information, and delivery information.

5. The marketplace of claim 1, wherein the participation criteria for at least one participant comprise default criteria specifying all types of transactions.

6. The marketplace of claim 1, wherein the initiated process comprises at least one associated person to assist in providing the corresponding service.

7. The marketplace of claim 1, wherein the specified event comprises the initiation of the associated commercial transaction.

8. The marketplace of claim 1, wherein the initiated process is operable to initiate a transfer of funds on behalf of the participant.

9. The marketplace of claim 8, wherein the transfer of funds is made by a financial agent of the participant to a financial agent of a second participant through the marketplace.

10. The marketplace of claim 8, wherein the initiated process is operable to generate information for communication to one or more enterprise resource planning (ERP) systems associated with the participant.

11. The marketplace of claim 1, wherein at least one of the processes is a participant qualification process operable to determine the acceptability of the participant and of one or more financial agents:
    from which the participant may select; and
    from or to which funds may be transferred on behalf of the participant.

12. A method operating on one or more computers for providing one or more financial transaction services to participants in connection with commercial transactions involving the participants, comprising:
    storing registration information for one or more types of transactions available to participants through a computer-implemented marketplace
    storing participation criteria for each participant which specifies one or more types of transactions in which the participant is willing to participate in association with the marketplace, each participant being pre-qualified to enter into the one or more types of transactions specified in the participation criteria for the participant;
    providing one or more processes each operable to provide an associated financial transaction service for one or more participants in connection with ongoing transactions involving the participants
    using the marketplace to initiate a selected process in response to a specified event associated with an ongoing transaction, according to the registration information and participation criteria, to provide a corresponding financial transaction service to at least one participant involved in the ongoing transaction; and
    monitoring activities of the at least one participant in the ongoing transaction to assess whether the participant should continue to be pre-qualified to participate in transactions of the same type as the ongoing transaction.

13. The method of claim 12, wherein at least some registration information comprises a time limit for a transaction or one or more aspects thereof.

14. The method of claim 12, wherein:
    at least some registration information comprises a payment point; and
    the marketplace further generates payment instructions for communication to a participant in response to a transaction reaching the payment point.

15. The method of claim 12, wherein at least some of the participation criteria is selected from the group consisting of item type information, value information, and delivery information.

16. The method of claim 12, wherein the participation criteria for at least one participant comprise default criteria specifying all types of transactions.

17. The method of claim 12, wherein the initiated process comprises at least one associated person to assist in providing the corresponding service.

18. The method of claim 12, wherein the specified event comprises initiation of the associated commercial transaction.

19. The method of claim 12, wherein the initiated process initiates a transfer of funds on behalf of the participant.

20. The method of claim 19, wherein a financial agent associated with the participant transfers the funds to a financial agent associated with a second participant through the marketplace.

21. The method of claim 19, wherein the initiated process further generates information for communication to at least one enterprise resource planning (ERP) system associated with the participant.

22. The method of claim 12, wherein at least one process is a participant qualification process that determines the acceptability of the participant and of one or more financial agents:
   from which the participant may select; and
   from or to which funds may be transferred on behalf of the participant.

23. A system for providing one or more financial transaction services to participants in connection with commercial transactions involving the participants, comprising:
   means for storing registration information for one or more types of transactions available to participants through a computer-implemented marketplace
   means for storing participation criteria for each participant which specifies one or more types of transactions in which the participant is willing to participate in association with the marketplace, each participant being pre-qualified to enter into the one or more types of transactions specified in the participation criteria for the participant;
   means for providing one or more processes each operable to provide an associated financial transaction service for one or more participants in connection with ongoing transactions involving the participants
   means for initiating a selected process in response to a specified event associated with an ongoing transaction, according to the registration information and participation criteria, to provide a corresponding financial transaction service to at least one participant involved in the ongoing transaction; and
   means for monitoring activities of the at least one participant in the ongoing transaction to assess whether the participant should continue to be pre-qualified to participate in transactions of the same type as the ongoing transaction.

24. Software operating at a computer-implemented marketplace for settling a commercial transaction between a buyer and a seller, the software being embodied in a computer-readable medium and when executed operable to:
   receive an order for at least one item from the buyer, the buyer being associated with stored participation criteria accessible to the marketplace that specifies one or more types of transactions in which the buyer is willing to participate in association with the marketplace, the participation criteria indicating that the buyer is willing to participate in purchase transactions, the buyer being pre-qualified to enter into the one or more types of transactions specified in the participation criteria for the buyer, the order received from the buyer initiating a purchase transaction;
   communicate the order to the seller for fulfillment of the order;
   receive notification from the seller in response to shipping of the item;
   receive notification from the buyer in response to acceptance of the item;
   communicate payment instructions to at least one financial agent associated with the buyer;
   receive payment from the financial agent associated with the buyer;
   communicate the payment to a financial agent associated with the seller;
   receive notification from the seller in response to acceptance of the payment;
   communicate accounting information reflecting settlement of the transaction; and
   monitor activities of the buyer in the purchase transaction to assess whether the buyer should continue to be pre-qualified to participate in purchase transactions.

25. The software of claim 24, further operable to communicate the order to a financial agent associated with the buyer or the seller.

26. The software of claim 24, wherein the financial agent associated with the buyer is integral to the buyer.

27. The software of claim 24, wherein the financial agent associated with the seller is integral to the seller.

28. The software of claim 24, further operable to communicate the accounting information to enterprise resource planning (ERP) functionality associated with the buyer or the seller.

29. A method, performed at a computer-implemented marketplace, for settling a commercial transaction between a buyer and a seller, comprising:
   receiving an order for at least one item from the buyer, the buyer being associated with stored participation criteria accessible to the marketplace that specifies one or more types of transactions in which the buyer is willing to participate in association with the marketplace, the participation criteria indicating that the buyer is willing to participate in purchase transactions, the buyer being pre-qualified by one or more computers to enter into the one or more types of transactions specified in the participation criteria for the buyer, the order received from the buyer initiating a purchase transaction;
   communicating the order to the seller for fulfillment of the order;
   receiving notification from the seller in response to shipping of the item;
   receiving notification from the buyer in response to acceptance of the item;
   communicating payment instructions to at least one financial agent associated with the buyer;
   receiving payment from the financial agent associated with the buyer;
   communicating the payment to a financial agent associated with the seller;
   receiving notification from the seller in response to acceptance of the payment communicating accounting information reflecting settlement of the transaction; and
   monitoring activities of the buyer in the purchase transaction to assess whether the buyer should continue to be pre-qualified to participate in purchase transactions.

30. The method of claim 29, further comprising communicating the order to a financial agent associated with the buyer or the seller.

31. The method of claim 29, wherein the financial agent associated with the buyer is integral to the buyer.

32. The method of claim 29, wherein the financial agent associated with the seller is integral to the seller.

33. The method of claim 29, further comprising communicating accounting information to enterprise resource planning (ERP) functionality associated with the buyer or the seller.

34. A marketplace for settling a commercial transaction between a buyer and a seller, comprising:
    one or more computers;
    means for receiving an order for at least one item from the buyer, the buyer being associated with stored participation criteria accessible to the marketplace that specifies one or more types of transactions in which the buyer is willing to participate in association with the marketplace, the participation criteria indicating that the buyer is willing to participate in purchase transactions, the buyer being pre-qualified to enter into the one or more types of transactions specified in the participation criteria for the buyer, the order received from the buyer initiating a purchase transaction;
    means for communicating the order to the seller for fulfillment of the order;
    means for receiving notification from the seller in response to shipping of the item;
    means for receiving notification from the buyer in response to acceptance of the item;
    means for communicating payment instructions to at least one financial agent associated with the buyer;
    means for receiving payment from the financial agent associated with the buyer;
    means for communicating the payment to a financial agent associated with the seller;
    means for receiving notification from the seller in response to acceptance of the payment means for communicating accounting information reflecting settlement of the transaction; and
    means for monitoring activities of the buyer in the purchase transaction to assess whether the buyer should continue to be pre-qualified to participate in purchase transactions.

35. The system of claim 1, wherein participants are pre-qualified using one or more of:
    one or more qualification ratings;
    one or more qualification rankings; and
    one or more qualification categories.

36. The system of claim 1, wherein the marketplace is further operable to automatically modify the pre-qualification of the at least one participant based on the monitoring of the activities of the participant in the ongoing transaction if such modification is determined to be appropriate.

37. The method of claim 12, wherein participants are pre-qualified using one or more of:
    one or more qualification ratings;
    one or more qualification rankings; and
    one or more qualification categories.

38. The method of claim 12, further comprising automatically modifying the pre-qualification of the at least one participant based on the monitoring of the activities of the participant in the ongoing transaction if such modification is determined to be appropriate.

39. The software of claim 24, wherein the buyer is pre-qualified using one or more of:
    one or more qualification ratings;
    one or more qualification rankings; and
    one or more qualification categories.

40. The software of claim 24, further operable to automatically modify the pre-qualification of the buyer based on the monitoring of the activities of the buyer in the purchase transaction if such modification is determined to be appropriate.

41. The method of claim 29, wherein the buyer is pre-qualified using one or more of:
    one or more qualification ratings;
    one or more qualification rankings; and
    one or more qualification categories.

42. The method of claim 29, further comprising automatically modifying the pre-qualification of the buyer based on the monitoring of the activities of the buyer in the purchase transaction if such modification is determined to be appropriate.

* * * * *